US010950127B2

(12) United States Patent
Yogamani et al.

(10) Patent No.: US 10,950,127 B2
(45) Date of Patent: Mar. 16, 2021

(54) FREESPACE DETECTION IN A DRIVER ASSISTANCE SYSTEM OF A MOTOR VEHICLE WITH A NEURAL NETWORK

(71) Applicant: Connaught Electronics Ltd., Tuam (IE)

(72) Inventors: Senthil Kumar Yogamani, Tuam (IE); Sunil Chandra, Tuam (IE)

(73) Assignee: Connaught Electronics Ltd., Tuam (IE)

( * ) Notice: Subject to any disclaimer, the term of this patent is extended or adjusted under 35 U.S.C. 154(b) by 92 days.

(21) Appl. No.: 16/113,043

(22) Filed: Aug. 27, 2018

(65) Prior Publication Data

US 2019/0080604 A1    Mar. 14, 2019

(30) Foreign Application Priority Data

Sep. 8, 2017  (DE) .................... 10 2017 120 729.5

(51) Int. Cl.
*G08G 1/14* (2006.01)
*G06K 9/00* (2006.01)
(Continued)

(52) U.S. Cl.
CPC ......... *G08G 1/143* (2013.01); *G06K 9/00791* (2013.01); *G06K 9/00805* (2013.01);
(Continued)

(58) Field of Classification Search
CPC ........... G06K 9/00805; G06K 9/00812; G06K 9/6274; G06K 9/00791; G06K 9/66
See application file for complete search history.

(56) References Cited

U.S. PATENT DOCUMENTS

2011/0200230 A1* 8/2011 Luke ............... G06K 9/00791
382/103
2012/0045119 A1* 2/2012 Schamp ............ B60R 21/0134
382/157
(Continued)

FOREIGN PATENT DOCUMENTS

DE    10 2009 028 660 A1    2/2011
DE    10 2013 205 949 A1    10/2013
(Continued)

OTHER PUBLICATIONS

Machine Translation of Arndt et al. DE 102009028660.*
(Continued)

*Primary Examiner* — Rami Khatib
(74) *Attorney, Agent, or Firm* — Osha Bergman Watanabe & Burton LLP

(57) ABSTRACT

The invention relates to a method for operating a driver assistance system (2) of a motor vehicle (1), including a) Capturing an environment (4) of the motor vehicle (1) by a capturing device (3) of the driver assistance system (2); b) Detecting an accessible freespace (6) in the captured environment (4) by a computing device (5) of the driver assistance system (2); c) Detecting and Classifying at least one object (7a-7e) in the captured environment (4) that is located at a border (8) of the freespace (6) by a neural network (9) of the driver assistance system (2); d) Assigning a part (10a-10e) of the border (8) of the freespace (6) to the detected and classified object (7a-7e); and e) Categorizing a part (11a-11e) of the freespace (6) adjacent to the part (10a-10e) of the border (8) that is assigned to the detected and classified object (7a-7e) in dependence upon the class of that classified object (7a-7e), so as to enable improved safety in driving.

11 Claims, 1 Drawing Sheet

(51) Int. Cl.
*G06K 9/62* (2006.01)
*G06K 9/66* (2006.01)
*G06N 3/08* (2006.01)
*G08G 1/04* (2006.01)

(52) U.S. Cl.
CPC ....... *G06K 9/00812* (2013.01); *G06K 9/6274* (2013.01); *G06K 9/66* (2013.01); *G06N 3/08* (2013.01); *G08G 1/04* (2013.01)

(56) References Cited

U.S. PATENT DOCUMENTS

| | | | |
|---|---|---|---|
| 2017/0169301 A1* | 6/2017 | Kunze | G06K 9/00825 |
| 2017/0262710 A1* | 9/2017 | Kozuka | B60Q 1/26 |
| 2017/0344021 A1* | 11/2017 | Sano | G06K 9/00791 |
| 2018/0120843 A1* | 5/2018 | Berntorp | G06K 9/00791 |
| 2018/0211403 A1* | 7/2018 | Hotson | G06K 9/4604 |
| 2018/0321686 A1* | 11/2018 | Kanzawa | G05D 1/0274 |
| 2019/0012548 A1* | 1/2019 | Levi | G06K 9/6267 |

FOREIGN PATENT DOCUMENTS

| | | |
|---|---|---|
| DE | 10 2013 225 778 A1 | 6/2015 |
| DE | 10 2014 212 478 A1 | 12/2015 |
| DE | 10 2015 115 012 A1 | 3/2017 |
| EP | 2 368 216 B1 | 12/2012 |

OTHER PUBLICATIONS

Szegedy, C. et al., "Deep neural networks for object detection", International Conference on Neural Information Processing Systems, USA, vol. 2, pp. 2553-2561, Oct. 12, 2013 (9 pages).

Statistical classification. In: Wikipedia, the free encyclopedia. Bearbeitungsstand: Aug. 26, 2017. URL: https://en.wikipedia.org/w/index.php?title=Statistical_classification&oldid=797282946%20[abgerufen%20am%2025.05.2019](5 pages).

* cited by examiner

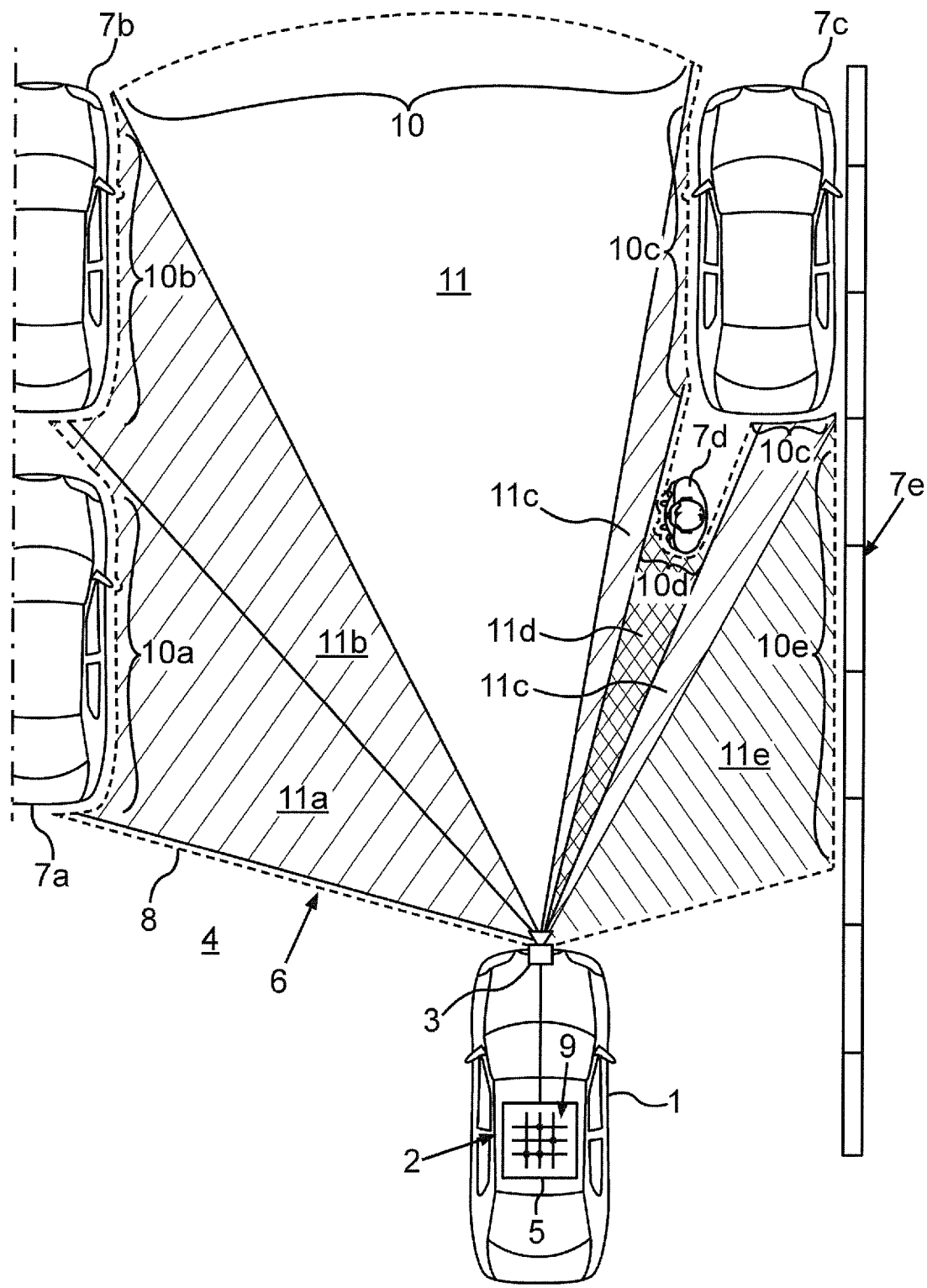

FREESPACE DETECTION IN A DRIVER ASSISTANCE SYSTEM OF A MOTOR VEHICLE WITH A NEURAL NETWORK

FIELD OF THE INVENTION

The invention relates to a method for operation a driver assistance system of a motor vehicle, including the method steps of capturing an environment of the motor vehicle by a capturing device of the driver assistance system and of detecting a freespace accessible to the vehicle in the captured environment by a computing device of the driver assistance system, where the freespace is preferably adjacent to the motor vehicle. The invention also relates to a driver assistance system for a motor vehicle, with a capturing device for capturing an environment of the motor vehicle and with a computing device for detecting a freespace accessible to the motor vehicle in the captured environment.

BACKGROUND

The detection of accessible freespace, that is, the detection of an area in the environment of the motor vehicle that is free of obstacles and hence can be driven on or accessed by the motor vehicle is important for driver assistance systems. This is particularly true when it comes to partially or fully automated driving, but may also be valuable for providing for instance a warning to a driver in manual driving. In particular in parking scenarios, this is very important, as many static and dynamic obstacles are present in such a scenario. There, the detection of freespace is not just the logical reverse of detecting an obstacle. Basically, any type of object detector detects objects within a specific region of interest (ROI) of processing. However, any object detector has a limited performance, that means, there are always missed objects. Therefore, the object detector alone cannot be used to define the freespace as a missed object could be within the presumed freespace.

Consequently, on one hand, freespace detection is used to erase dynamic obstacles in a map of the environment stored in the driver assistance system which cannot be tracked in the map of the environment. This means that a good freespace detection will erase dynamic obstacles in their previous position very quickly without erasing static obstacle information. On the other hand, a freespace detection shall erase falsely detected obstacles. A driver assistance system needs to ensure keeping static obstacles in the environmental map, quickly erasing the previous position of a dynamic obstacle and reducing false positives by quickly erasing falsely detected obstacles. Furthermore, freespace detection can be used to partially correct the error of the ego vehicle odometry calculation, when a re-detection of a static obstacle does not give the same position. In this case, in the freespace detection, the obstacle from previous detections must correctly be erased. Usually such a freespace detection is based on depth or distance information for different sensor channels and/or different sectors that can extend fan-like from the position of the capturing device, for instance a camera, into the environment. Such a freespace detection is, for instance, described in the DE 10 2015 115 012 A1.

SUMMARY OF THE INVENTION

It is an object of the present invention to enable improved safety in driving, in particular semi-automated or fully automated driving with a motor vehicle.

This object is solved by the subject matters of the independent claims. Advantageous embodiments are apparent from the dependent claims, the description and the FIGURE.

One aspect of the invention relates to a method for operating a driver assistance system, in particular a parking assistance system, of a motor vehicle, including several method steps. One method step is capturing an environment of a capturing device of the driver assistance system. In particular, the capturing device may include a camera device with one or several, for instance four, cameras. Here, it is advantageous if the capturing device includes one or more hardware accelerators enabling for instance a processing of 16 mega pixels per second or more. To this end, the capturing device may comprise for instance four cameras with at least 1 mega pixel each, which have a refresh rate of at least 15 frames per second, as described below.

Another method step is detecting an accessible freespace in the captured environment by a computing device of the driver assistance system. In particular, the freespace is adjacent to the motor vehicle. The detecting can be done by determining the distance from the car for several sectors that extend fan-like from the capturing device into the environment of the motor vehicle as in the state of the art cited above, for example. Such a set of distance can also be called a depth map as the distances describe the depth of the accessible freespace from the vehicle's point of view. Optionally, a segmentation algorithm using the known perceptual grouping can be used to enhance such a depth map. Preferably, a so-called dense depth map based on millions instead of the conventional thousands of flow vectors in a sparse depth map is used in the freespace detection. So, such a dense depth map is based on a so-called dense optical flow with preferably one megapixel or more. By contrast, the traditional sparse optical flow features only a kilo pixel. Because of the computational complexity of processing millions of flow vectors, it is efficient to tile them and distribute them adaptively across different tiles of the respective images according to the scene complexity. For instance, regions on the sky are very smooth and fewer feature or flow vectors can be allocated here based on the confidence level of each, where the confidence level is in particular provided as a posterior estimate.

Furthermore, prior knowledge based learning may be acquired as well, that is, regions of sky, road and other regions may be learned via the spatial layout of typical distributions in the optical flow. In particular, these flow vectors may be separated into static and dynamic vectors. This can be preferably be effected after the tiling of the flow vectors. The static and dynamic vectors may be calculated using different constraints, for instance an epi-polar geometric constraint and/or a spatial consistency constraint and/or a temporal propagation constraint. The moving points may be separated out and passed through a lattice-based clustering algorithm. In contrast to a regular clustering method, here the points may be distributed on a regular lattice and exploit the partial ordering of the points in the lattice to produce a better clustering algorithm. The static points can be processed by a structure from motion pipeline (SFM-pipeline). Therein, the relative pose of the camera may be calculated by a combination of planar homography based on point to the ground plane and an essential matrix computation for non-ground points.

This complimentary combination provides robustness to the estimate which is advantageous for the accuracy of the next steps in the structure-from-motion-pipeline. A 3D-reconstruction may be computed using a re-projection error metric and iterative least squares.

Typically, such a 3D-reconstruction is very noisy. Due to the ambiguity of low textures regions, parallel moving objects, or noisy triangulation estimates, there are also a lot of holes or uncovered areas in the reconstruction. The holes can even dominate in terms of number of flow vectors relative to the correct estimates in a difficult scenario. It is therefore advantageous, to use a total variation based regularization algorithm which can fill in the holes and form a smoother depth map. This is very helpful for getting a precise freespace estimate. For freespace detection, it is important to reconstruct the ground plane as precise as possible. In particular, using a dense optical flow and what can be called a dense depth map (in particular in the above specified meaning) can, when, for instance, averaging over time, lead to a smooth and precise ground plane reconstruction which may not be possible with a sparse representation of the environment.

Another method step is detecting and/or classifying at least one object in the captured environment that is located at a border of the freespace, in particular the detected freespace, by a neural network of or in the driver assistance system. So, at least one object, that is, one object or several objects, located adjacent to the detected freespace are detected and classified. Here, the neural network may be used for detecting and classifying an object with the known "sliding window object detection" for detecting pedestrians, cyclist and vehicles. This sliding window object detection is computational intensive and one of the challenges is to design an efficient network that implements the method with reasonable computational cost. As only the objects close to the border of the detected freespace are relevant for the proposed method, for example the sliding window object detection can be applied while being restricted to an area with a pre-set maximal distance from the border of the detected freespace. This saves a lot of computational cost.

As the usual approaches using region convolution neural networks (R-CNN) and cascade convolution neural networks (C-CNN) leave holes in feature maps, they are not suitable for the proposed method. Instead, in particular, a generic function learning approach is proposed where the neural network is trained for recognizing abstract features instead of a full object classification. In contrast to a full object classification, where, for example the contour of pedestrians, cyclists and vehicles needs to be learned, in the present approach the neural network only needs to learn to recognize the parts of the object that are located at the border of the freespace, hence, for example, it is sufficient to recognize the feet of a pedestrian or wheels of a cyclist or vehicle. Therefore, the abstract features the neural network needs to learn are not necessarily linked to images or ideas as they are perceived or understood by humans, hence the name "abstract feature".

We call this generic function learning approach, since this reduces the amount and/or quality of necessary learning. This can help (an engine of) the driver assistance system to better handle noise and resolve confusion between two objects by synthesising the available information holistically. So the neural network can produce a feature map, where features, in particular the above mentioned abstract features, are assigned to different subsections of the captured environment, for example, different subsections of a camera image. Based on these features, the objects may be detected and/or classified in that respective subsection with a respective confidence value. So, if many features of one class of objects are activated or detected in the feature map for a specific area or subsection, this subsection may be classified as belonging to the respective class of objects. Note that a specific subsection can be classified as belonging to different classes according to the activated or detected features in that subsection with different probabilities represented by the confidence value. So, the classification does not need to be limited to one class per object and/or subsection. In contrast, the feature map may be used to assign a respective probability for more than one object class for the respective subsection or area. So, based on the feature map, a probability for a pedestrian in a specific subsection may be determined as 55% and a probability for a cyclist in that very same subsection may be determined as 35%, for instance.

Another method step is assigning a part of the border that is adjacent to the detected and/or classified object to the detected and classified object by the computing device. This assignment can be part of the classifying. When detecting and/or classifying several objects, different parts of the border may hence be assigned to different objects. In particular, one specific part of the border may only be assigned or assignable to one single object.

Another method step is categorizing a part of the freespace adjacent to the part of the border that is assigned to the detected and/or classified object in dependence of the class of that (detected and/or classified) object which is adjacent to the part of the border (and hence the part of the freespace to be categorized) by the computing device. So, different parts of the freespace are categorized as belonging to different categories, leading to what can be called a "semantic freespace" or "semantic freespace detection", where freespace is not considered to be uniform freespace that is accessible or driveable by the motor vehicle, but rather to be a freespace with different parts or sub areas having different adjectives describing characteristics of the freespace and that are summarized in the term "semantic" that indicate to the driver assistance system how the motor vehicle should behave when entering and/or approaching the different parts of freespace. Here, noise can be smoothed out in the estimation, that is, detection and/or classification of objects and measurement of depth, that is, of respective distances assigned to different sections of the freespace, in spatial and temporal dimensions via spatio-temporal fusion of the categorized freespace. In the spatio-temporal fusion data from different cameras as capturing units may be fused. The assumption that the data of different time steps are not independent results in advantages of the spatio-temporal fusion. Here, for instance a conditional random field (CRF) may be used for capturing transitions and the combination of the so-called depth map with the feature map of the neural network. Conditional random fields also lend elegantly to efficient recursive estimation using loop belief propagation and can be fused with other probabilistic graphical models for subsequent sensors or other sensors and inference engines. This leads to a stable and robust semantic freespace detection and/or robust semantic freespace map.

The proposed method provides what is called here a semantic freespace detection, that is, a freespace detection where regions or parts of the freespace are categorized individually according to the object at the edge or border of the respective region of the freespace instead of detecting the freespace as one single region with homogeneous properties or characteristics. The output of the freespace detection may be a distance from the motor vehicle for each of a number of sectors the freespace is divided into. Such a distance may be referred to as depth, hence the detected freespace may be referred to as or including a depth map. The sectors may be organized fan-like starting from the position of the capturing device, for instance the camera and extend towards the edge or border of the freespace determined by the respective objects or a range of the capturing device.

As for the so-called semantic freespace detection, the freespace comprises semantics, that is, further information concerning respective regions or parts or subsections of the freespace as well, meaning there will be an object detection associated to the freespace detection. Knowing the regions or parts of the freespace helps to adapt to moving objects and estimate the risk of collision which enables better manoeuvring algorithms for automated driving, for instance. It also helps to predict or anticipate changes in freespace for temporal processing. For instance, fast moving objects or vehicles may change freespace drastically.

In the proposed method, neural learning recognition, for instance deep learning recognition, is combined with classical algorithms like structure-from-motion segmentation and/or color segmentation for obtaining a freespace detection where different parts or regions of the freespace are associated with different properties and hence enable a differentiated driving behaviour adapted to the respective environment and the properties of the objects detected therein. So, for instance, different speed limits may be set for the motor vehicle moving in or to parts or regions of the freespace that are adjacent to different objects. For example in parts of the freespace that are adjacent to a pedestrian, the motor vehicle may not be allowed to drive faster than walking speed. In contrast, in parts of the freespace that are adjacent to cars, this speed limit may be not applied for instance.

Altogether, the novel approach of using a neural network for classifying objects and, in consequence, categorizing different parts or regions of the freespace in combination with the conventional (depth) information for computing the freespace provides an accurate and reliable freespace detection in form of detecting the semantic freespace. It is even possible to double-check the conventional freespace detection with the results of the neural network. A dense feature detection can help to provide full information about smooth textures on surfaces, which is not possible in the conventional sparse feature detection due to lack of points on the smooth surface. Hence, the proposed method is in particular effective when using dense feature detection.

In a preferred embodiment, it is provided that a part of the freespace adjacent to another part of the border, that is, a part of the border that is not assigned to the object or the objects, in particular a part of the freespace adjacent to the rest of the border, is categorized as safely accessible freespace by the computing device. This gives the advantage of a reasonable standard classification for freespace which is limited by the range of the capturing device.

Herein, the detecting of the accessible freespace may in particular be effected before or after detecting and/or classifying the object(s). Detecting the accessible freespace before give the advantage that only objects at the border or edge of the detected freespace need to be detected and/or classified.

In another advantageous embodiment, it is provided that a respective risk and/or danger is assigned to the categories of freespace that the part of the freespace can be categorized into, in particular a risk for a collision with the object adjacent to the respective part of the freespace. This gives the advantage that the categories are particularly helpful for driving, in particular the semi-automated or fully automated driving.

Herein, it may be provided that the categories for the freespace comprise a category for safely accessible freespace and/or a category for potentially dangerous freespace, where for instance a first speed limit is set, and/or a category for dangerous freespace, where for instance a second, as compared to the first speed limit preferably lower, speed limit is set or driving into is prohibited. So, for instance by means of the categories, the motor vehicle can be hindered from driving into a freespace that is adjacent to a pedestrian as the pedestrian is particularly vulnerable. To this end, the part of the freespace adjacent to an object classified as pedestrian could be categorized as dangerous freespace. The part of the freespace adjacent to an object classified as car could for example be categorized as potentially dangerous freespace, where a speed limit applies as cars may move fast but are less vulnerable than a pedestrian. A part of the freespace adjacent to an object classified as stationary object, for instance a tree, may be categorized as safely accessible freespace, as a stationary object will not move. The categories may also be linked to a depth or distance information. So, the freespace may be categorized also based on the respective distance of the detected and/or classified object from the motor vehicle.

This gives the advantage, that different parts of the freespace are associated with different characteristics or properties. This allows to adapt the driving behaviour, in particular the driving behaviour in the semi-automated or fully automated driving, to the situation at hand in a very specific, adaptive way leading to improved safety and comfort.

In another advantageous embodiment, it is provided that the classes for the object comprise a (at least one) class for static obstacles, in particular a class for obstacles that can be driven over, in particular curbs, and/or a (at least one) class for obstacles that cannot be driven over, and/or a (at least one) class for dynamic obstacles, in particular a class for pedestrians and/or a class for cyclists and/or a class for motor vehicles such as motorbikes, cars or lorries. These classes for the object have been proven specifically useful for a meaningful and hence helpful semantic freespace detection improving driving safety.

In another advantageous embodiment it is provided that in the classifying of the at least one object, more than one class is assigned to the classified object and a confidence value (that represents the probability that the respective class assigned to the classified object is true) is assigned to each class assigned to the object, and the categorizing of the part of the freespace is effected in dependence upon the classes of that classified object and the respective confidence values. This gives the advantage that the categorizing is specifically flexible and reliable.

Herein, it may be provided that in the categorizing of the part of the freespace the confidence values for the classes of the classified object are compared, and the freespace is categorized into the category for the freespace that corresponds to the class with the highest confidence value if this (highest) confidence value differs from the second highest confidence value of the classes assigned to the classified object more than a pre-set threshold, and, in particular, the freespace is categorized into the category that the highest respective risk is assigned to if the highest confidence value differs from the second highest confidence value is less than that threshold. So, for example, if the pre-set threshold is 10%, if an object is classified as belonging to the object class of motor vehicles with the probability of 60% and belonging to the object class of pedestrian with a probability of 40%, the freespace will be categorized into the category that corresponds to the motor vehicle class in this example. For instance, the freespace may be categorized as potentially dangerous freespace. If, in this example, on the other hand the confidence value for the classified object indicates a probability of 51% for the object being a motor vehicle and 49% for the object being a pedestrian, the difference of the confidence values is smaller than the pre-set threshold here. Hence, the freespace is categorized into the category with the highest respective risk assigned to in the present example. That is, in the present example the freespace adjacent to said object will be categorized as dangerous freespace (in spite of the object being classified as a motor vehicle and the category of potentially dangerous freespace would be more appropriate according to the confidence values).

This gives the advantage that the categorizing can be more flexible and in ambiguous situations a potential risk for collision can be minimized.

In another embodiment, it is provided that the capturing device comprises several cameras and the detecting of the accessible freespace as well as the detecting and/or classifying of the at least one object as well as the assigning of the part of the border and the categorizing of the part of the freespace is effected for pictures of the captured environment that are taken by different cameras, and results of the categorization that are based on different pictures of the same and/or different cameras are fused into an overall result of categorisation with the assumption that the results are dependent on each other as described by a pre-set rule. Here, in particular, the fusing is effected using a conditional random field. This can be called a spatio-temporal fusion of the pictures.

This gives the advantage that the data, that is, the results that are based on the individual single pictures can be used to enhance the results when processing subsequent pictures of the same camera or pictures of the other cameras. Hence, the effectiveness of the method is improved.

In yet another embodiment, the neural network comprises a convolutional neural network, in particular a deep neural network with multiple hidden layers. This gives the advantage that the neural network is specifically fit for detecting and/or classifying objects in for instance pictures. Hence, the method is particularly effective.

In another advantageous embodiment it is provided that the neural network is trained to classify the object, in particular to detect and to classify the object, (already or purely, that is solely,) based on a part of the object that is adjacent to the border. The part may cover less than 80%, in particular less than 50% and preferably less than 20% of the object. This gives the advantages that the network not necessarily has to be trained to detect the complete object and/or to classify the object based on the complete object, for instance the complete outline, but that a part of the object may be sufficient for the object detection and/or classification. This makes training of the neural network easier and saves resources and can lead to faster results.

In another embodiment, it is provided that the capturing is effected by a capturing device with at least one camera with each camera having at least 0.1 mega pixel, in particular at least 1 mega pixel, preferably at least 4 mega pixel. This gives the advantage that the above-mentioned dense processing, the dense depth map and dense feature representation is enabled.

Another aspect of the invention relates to a driver assistance system or a motor vehicle, with a capturing device for capturing an environment of the motor vehicle and a computing device for detecting an accessible freespace in the captured environment. Herein, the driver assistance system comprises a neural network that is formed to detect and/or classify at least one object in the captured environment that is located at the border of the freespace, in particular the detected freespace.

Furthermore, the computing device is formed to assign a part of the border to the detected and/or classified object as well as to categorize a part of the freespace adjacent to the part of the border that is assigned to detected and/or classified object in dependence upon the classified object.

Advantages and advantageous embodiments of the driver assistance system correspond to advantages and advantageous embodiments of the described method. The invention furthermore relates to a motor vehicle with such a driver assistance system.

BRIEF DESCRIPTION OF THE DRAWINGS

The single FIGURE shows a schematic representation of a motor vehicle with a driver assistance system in accordance with one or more embodiments herein.

DETAILED DESCRIPTION

The features and feature combinations mentioned above in the description as well as the features and feature combinations mentioned below in the description of FIGURES and/or shown in the FIGURES alone are usable not only in the respectively specified combination, but also in other combinations without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or deviate from the feature combinations set out in the relations of the claims.

Below embodiments of the invention are explained in more detail based on a schematic drawing. Therein the only FIGURE shows a schematic representation of a motor vehicle with an exemplary embodiment of a driver assistance system in an exemplary scenario.

Therein, the motor vehicle 1 is equipped with a driver assistance system 2 that comprises a capturing device 3 for capturing an environment 4 of the motor vehicle 1 and with a computing device 5 for detecting an accessible freespace 6. Here, the freespace 6 is adjacent to the motor vehicle 1 in the present example.

The computing device 5 comprises a neural network 9 in the current example. The neural network 9 is formed to detect and classify at least one object, presently several objects 7a to 7b, in the captured environment 4, that is, objects 7a to 7b presently located at a border 8 of the freespace 6. The computing device 5 is formed to assign a respective part 10a to 10e of the border 8 to the detected and classified objects 7a to 7e as well as to categorize respective parts 11a to 11e of the freespace 6 adjacent to the respective parts 10a to 10e of the border 8 (that are assigned to the detected and classified objects 7a to 7e) in dependence upon the class of the classified objects 7a to 7e.

So, in the present example, the regions or parts 11a, 11b, 11c are categorized in dependence upon the class of the objects 7a, 7b, and 7c. Presently, as the objects 7a, 7b, 7c are classified as vehicles, the parts 11a, 11b, 11c of the freespace 6 are categorized as potentially dangerous freespace here. So, for instance a speed limit may be set for the motor vehicle 1 when heading towards or into the respective regions or parts 11a, 11b, 11c. The part 11d of freespace 6 is categorized in dependence upon the class of the object 7d, which is presently classified as pedestrian. Hence, in the present example, the region or part 11d of the freespace 6 is categorized as dangerous freespace. So, for instance, it may be prohibited for the motor vehicle 1 to head into the part 11d of the freespace 6. The region or part 11e of freespace 6 is, in the present example categorized in dependence upon the class of object 7e, which is classified as a curb here. Hence, the part 11e is categorized in a conditionally accessible freespace here. For example, a second speed limit that may be higher than the above-mentioned first speed limit is set when the motor vehicle 1 heads into that part 11e of freespace 6.

In the present example the part 10 of the border 8 is not assigned to any object. The part 11 of the freespace 6 adjacent to that part 10 of the border is, in the present example, consequently categorized as safely accessible freespace. Hence, for example no speed limit is set in a semi-automated or fully automated driving here when the vehicle 1 heads into the part 11 of the freespace 6.

In the present example, the neural network 9, that preferably comprises or is a convolutional neural network, is trained to classify the objects 7a to 7e based on a part of the respective object 7a to 7e that is adjacent to the border 8. So, the neural network 9 is able to classify the objects 7a to 7e with analysing only the part of the respective objects 7a-7e adjacent to the border 8 of the freespace 6. Herein, an object 7a to 7e may be classified not only in one class but in more than one class, where a respective confidence value is assigned to each of the classes the classified objects 7a to 7e are assigned to. Here, the confidence value indicates the probability for the respective class assigned to the classified object 7a-7e to be true. So, the neural network 9 may be trained using a generic function learning approach with abstract feature maps. Therein, the abstract features may not necessary need to be understood intuitively by humans. The abstract features may be evaluated for classifying or for detecting the respective object in a respective area of an image, for instance, a camera image of the capturing device 3.

The invention claimed is:

1. A method for operating a driver assistance system of a motor vehicle, comprising:
   a) capturing an environment of the motor vehicle by a capturing device of the driver assistance system;
   b) detecting an accessible freespace in the captured environment by a computing device of the driver assistance system;
   c) detecting and classifying a plurality of objects in the captured environment that are located at a border of the freespace by a neural network of the driver assistance system to produce a plurality of classified objects;
   d) assigning a part of the border of the freespace to a classified object among the plurality of classified objects; and
   e) categorizing a part of the freespace adjacent to the part of the border that is assigned to the classified object in dependence upon the class of the classified object,
   wherein a respective risk is assigned to the categories for the freespace that the part of freespace is categorized into a risk for a collision with the classified object adjacent to the respective part of freespace,
   wherein in the classifying of the at least one object according to method step c), more than one class is assigned to the classified object and a confidence value that indicates the probability for the respective class assigned to the classified object to be true is assigned to each class assigned to the classified object,
   wherein in the categorizing of the part of the freespace according to method step e), the confidence values for the classes of the classified object are compared,
   wherein the freespace is categorized into the category for the freespace that corresponds to the class with the highest confidence value, when this confidence value differs from the second highest confidence value of the classes assigned to the classified object more than a preset threshold, and
   wherein the freespace is categorized into the category that the highest respective risk is assigned to, when the highest confidence value differs from the second highest confidence value less than the preset threshold.

2. The method according to claim 1, wherein a part of the freespace adjacent to another part of the border that is not assigned to the classified object and is adjacent to the rest of the border, is categorized as safely accessible freespace.

3. The method according to claim 1, wherein the categories for the freespace comprise a category for safely accessible freespace and/or a category for potentially dangerous freespace and/or a category for dangerous freespace.

4. The method according to claim 1, wherein the classes for the classified object comprise a class for static obstacles that are driven over, and/or a class for obstacles that are not driven over, and/or a class for dynamic obstacles comprising pedestrians and/or a class for cyclists and/or a class for motor vehicles.

5. The method according to claim 1, wherein:
   the categorizing of the part of the freespace according to method step e) is effected in dependence upon the classes of that classified object and the respective confidence values.

6. The method according to claim 1, wherein the capturing device comprises several cameras and the detecting according to method step b) and detecting and classifying according to method step c) and assigning according to method step d) and categorizing according to method step e) is effected for pictures of the captured environment that are taken by the different cameras, and results of the categorization that are based on different pictures of the same and/or of different cameras are fused into an overall-result of categorization with the assumption that the results are dependent on each other as described by a preset rule, where the fusing is effected using a conditional random field.

7. The method according to claim 1, wherein at the neural network comprises a convolutional neural network which is a deep neural network with multiple hidden layers.

8. The method according to claim 1, wherein the neural network is trained to classify the object based on a part of the object that is adjacent to the border, where the part may cover less than 20% of the object.

9. The method according to claim 1, wherein the capturing according to method step a) is effected by a capturing device with a camera with 4 mega pixel.

10. A driver assistance system for a motor vehicle, comprising:
   a capturing device for capturing an environment of the motor vehicle;
   a computing device for detecting an accessible freespace in the captured environment; and a neural network that is formed to detect and classify a plurality of objects in the captured environment that are located at a border of the detected freespace to produce a plurality of classified objects, wherein the computing device is formed to assign a part of the border to a classified object among the plurality of classified objects as well as to categorize a part of the freespace adjacent to the part of the border that is assigned to the classified object in dependence upon the class of the classified object, wherein a respective risk is assigned to the categories for the freespace that the part of freespace is categorized into a risk for a collision with the classified object adjacent to the respective part of freespace, wherein in the classifying of the at least one object according to method step c), more than one class is assigned to the classified object and a confidence value that indicates the probability for the respective class assigned to the classified object to be true is assigned to each class assigned to the classified object, wherein in the categorizing of the part of the freespace according to method step e), the confidence values for the classes of the classified object are compared, and wherein the freespace is categorized into the category for the freespace that corresponds to the class with the highest confidence value, if this confidence value differs from the second highest confidence value of the classes assigned to the classified object more than a preset threshold, and wherein the freespace is categorized into the category that the highest respective risk is assigned to, when the highest confidence value differs from the second highest confidence value less than the preset threshold.

11. A motor vehicle with a driver assistance system according to claim 10.

\* \* \* \* \*